United States Patent [19]
Shou et al.

[11] Patent Number: 6,081,549
[45] Date of Patent: Jun. 27, 2000

[54] PHASE CORRECTION METHOD AND APPARATUS FOR SPECTRUM SPREAD WIRELESS COMMUNICATION RECEIVER

[75] Inventors: Guoliang Shou; Changming Zhou; Xuping Zhou, all of Setagaya-ku, Japan

[73] Assignee: Yozan Inc., Tokyo, Japan

[21] Appl. No.: 09/004,607

[22] Filed: Jan. 8, 1998

[30] Foreign Application Priority Data

Jan. 10, 1997 [JP] Japan .................................. H09-013164

[51] Int. Cl.[7] .................................................. H04K 1/00
[52] U.S. Cl. ............................................. 375/152; 375/366
[58] Field of Search ................................. 375/200, 365, 375/366, 367, 343, 152, 147, 130; 370/526–528

[56] References Cited

U.S. PATENT DOCUMENTS

| | | | |
|---|---|---|---|
| 5,619,524 | 4/1997 | Ling et al. ................................ | 375/200 |
| 5,659,573 | 8/1997 | Bruckert et al. ......................... | 375/200 |
| 5,822,364 | 10/1998 | Yamada et al. .......................... | 375/200 |

OTHER PUBLICATIONS

"Rayleigh Fading Compensation Method for 16QAM-MODEN in Digital land Mobile Radio Systems", Seiichi SAMPEI, The Transactions of the Institute of Electronics, Information and Communication Engineers, B–11, vol. J72–B–11, No. 1, pp. 7–15, Jan. 1989.

"Time Spreading Filter as an Impulse Noise–Combater", Xuping ZHOU et al., International Symposium on Information Theory & its Applications, Sydney, Australia, pp. 20–24, Nov. 1994.

"The Performance of Channel Estimation Method Using Weighted Multi–Symbol Averaging (WMSA) with Pilot Chanel in DS–CDMA", Sadayuki Abeta et al., Technical Report of IEICE, The Institute of Electronics, Information and Communication Engineers.

"A Smooth Envelope Parallel Modulation/Demodulation Scheme", Shigeru Tomisato et al., Technical Report of IEICE, The Institute of Electronics, Information and Communication Engineers, pp. 59–64.

Primary Examiner—Tesfaldet Bocure
Attorney, Agent, or Firm—Pillsbury Madison & Sutro, LLP

[57] ABSTRACT

Phases of the spread spectrum signal are corrected with a high degree of accuracy by a minimum of circuitry. One of phase correction circuits 31–34 of the receiver corresponds to each path. The I-component and Q-component of a despread output are supplied to the phase correction circuits 31–34. A phase error extractor 1 extracts the first phase error from a received pilot block. A phase corrector 2 corrects the phase error of a received information symbol using a correction vector that has been calculated based on the first phase error. The RAKE synthesizer 25 synthesizes the corrected received signal with outputs of the phase correction A circuits of other paths and outputs the synthesized signal to a temporary determiner 3 which temporarily determines an information symbol to be processed. The phase error is modified in a correction vector modifier 4 using the temporary determination result. A new correction vector is calculated based on the modified phase error. In this way, the correction vectors are sequentially modified based on the temporary determination results for the information symbols.

10 Claims, 6 Drawing Sheets

FIG. 2 *PRIOR ART*

PHASE CORRECTION METHOD AND APPARATUS FOR SPECTRUM SPREAD WIRELESS COMMUNICATION RECEIVER

This patent application claims a conventional priority based on a Japanese patent application HEI9-13164 filed on January 10, 1997, the contents of which are hereby incorporated by reference.

BACKGROUND OF THE INVENTION

1. Field of the Invention

The present invention relates to a phase correction method and apparatus for a spread spectrum wireless communication receiver.

2. Description of Related Art

In wireless communication systems such as mobile wireless systems and wireless LANs, so-called multi-pass fading is generated since signals transmitted from a base station reach a receiver through multiple propagation paths having different path lengths, and the received signals are not added coherently. The RAKE reception system that uses direct spread spectrum signals is known as an effective countermeasure against such multi-path fading.

FIG. 1 shows an example of the frame structure of transmission data in the case in which the RAKE reception system is employed. In this example the pilot symbol blocks P1, P2, . . . , Pn+1 (collectively referred to as P) and the information symbol blocks I1, I2, . . . , In (collectively referred to as I) are arranged alternately in each frame. The length of each of the pilot symbol blocks P1, P2, . . , Pn+1 is set to L symbols, and a known symbol sequence is transmitted. In addition, a prescribed number of information symbols (for example, 36 symbols) is included in each of the information blocks I1, I2, . . . , In.

FIG. 2 is key components of a mobile station 61 for the wireless communication system. In this drawing, the transmission unit is eliminated for the simplicity of the explanation. A spread spectrum signal is received by the reception antenna 11, transformed into an intermediate frequency signal in the high frequency receiver 12, split into two signals in the distributor 13, and supplied to the multipliers 16 and 17. The oscillator 14 generates a signal (cos ωt) having an intermediate frequency. The output from the oscillator 14 is directly supplied to the multiplier 16, and is input to the multiplier 17 via a phase shift circuit 15 which shifts the phase by $\pi/2$.

The multiplier 16 multiplies an intermediate frequency signal received from the distributor 13 and the oscillation output from the oscillator 14, and outputs a base band signal Ri consisting of an in-phase component (I component) via a low-pass filter 62. The multiplier 17 multiplies the intermediate frequency signal from the distributor 13 and the output (sin ωt) of the phase shift circuit 15, and similarly outputs a base band signal Rq consisting of a quadrature component (Q component) via a low-pass filter 64. In this way, the received signal is quadrature-detected.

The base band signals Ri and Rq are input to a complex-type matched filter 18, are multiplied by a PN code sequence generated by a PN code sequence generating circuit 19, and are despread. The in-phase component Si of the despread output and the quadrature component Sq of the despread output are emitted from the matched filter 18 and are input to a delay detection circuit 20, a signal level detector 22, and a phase correction means 24.

The delay detection circuit 20 detects the delay of the despread output Si, Sq and outputs the detected delay to a frame synchronization circuit 21 in which the timing of each frame is detected. The resultant timing signal Cf is supplied to the phase correction means 24. The signal level detector 22 calculates the received signal level from the I component Si of the despread output and the Q component Sq of the despread output. The multi-path selector 23 selects multiple peaks having high signal levels as multiple paths. The output Cm of this multi-path selection circuit 23 is input to the phase correction means 24.

The phase correction means 24 corrects the phase of the received signal corresponding to each of the paths. The phase-corrected output of each of the paths is emitted from the phase correction means 24, is synchronously synthesized in a RAKE synthesizer 25, and is output to an output circuit 26. The output of this output circuit 26 is supplied to a subsequent decision circuit or not like which de-modulates and processes the signal.

FIG. 3 is a block diagram showing an example of the interior structures of the phase correction means 24 and the RAKE synthesizer 25. The despread received signals Si and Sq, which are output from the complex-type matched filter 18, are input into the phase correction means 24. The phase correction means 24 has a selector 30 which selectively outputs the despread received signals Si and Sq to multiple phase correction circuits 31–34, which correspond to the multiple paths, with timings that correspond to each of the multiple paths.

The-timing signal Cf output from the frame synchronization circuit 21 and the signal Cm output from the multi-path selector 23 are supplied to the selector 30 and phase correction circuits 31–34. The timing signal Cf initiates the sampling clock generation and the signal Cm defines the sampling timing measured from the timing signal Cf. Each of the phase correction circuits 31–34 corrects the phase of the despread signal of each of the respective paths. The output of each of the phase correction circuits 31–34 is: (1) input into one of the corresponding delay circuits 35–38; (2) delayed by the corresponding delay time so that the timing of all the outputs will coincide; and (3) input to a synthesis circuit 39.

By this procedure, the phase and timing of the received signals output from multiple paths are synchronized when the received signals output from multiple paths are synthesized. In this way, the paths are diversified.

As shown in FIG. 1, the received signal is composed of alternating pilot symbol blocks P and information symbol blocks I. The phase correction process performed in the phase correction circuits 31–34 uses a correction signal (correction vector) calculated from the phase rotation amount (error vector) of the pilot signal contained in the received pilot symbol block P.

Two methods for performing this phase correction process are known. In the first method, a correction vector is calculated from the pilot symbol blocks P positioned before and after the information symbol block I. In the second method, phases are corrected by a correction vector obtained from the pilot symbol block P positioned before the information block I.

FIG. 4 is a block diagram showing an example of the phase correction circuits 31–34 employed for the above-mentioned first method wherein a correction vector is calculated from two pilot symbol blocks P. The delay means 41 stores the received information symbol blocks I and outputs them with a delay. The phase error extractor 42 extracts and averages the phase errors of the received pilot symbol blocks P positioned before and after the information symbol block I to be processed.

The phase corrector 43 corrects the phase by: (1) calculating a correction signal (correction vector) based on the error signal (error vector) emitted from the phase error extraction means 42; and (2) multiplying the correction vector and the received information symbol block I to be processed that is emitted from the delay means 41.

If a complex valued pilot symbol transmitted from a transmitter is given by (a+j·b), and a despread reception pilot symbol is represented by (Pi+j·Pq), the average value of the phase errors in the pilot symbol block P is expressed as follows.

$$E = \frac{1}{L}\sum_{k=1}^{L}(P_i^k + j \cdot P_q^k) \cdot (a^k - j \cdot b^k) \tag{1}$$

Here, L represents the number of symbols contained in the pilot symbol block P, and the superscript k represents the number of the pilot symbol.

Since the pilot symbol (a+j·b) to be transmitted is usually a combination of a =(−1, +1) and b=(−1, +1), the average phase error E of the pilot symbol given by equation (1) can be calculated essentially by only adders.

The average phase error vector of the pilot symbol blocks P positioned on both sides of the information symbol block I that has been calculated in accordance with equation (1) can be represented by equations (2) and (3).

$$E^{(1)}=E^{(1)}{}_i+j \cdot E^{(1)}{}_q \tag{2}$$

$$E^{(2)}=E^{(2)}{}_i+j \cdot E^{(2)}{}_q \tag{3}$$

Here, $E^{(1)}$ represents the average error vector of the pilot symbol block P that precedes the information symbol block I to be processed, and $E^{(2)}$ represents the average error vector of the pilot symbol block P that follows the information symbol block I to be processed.

Next, a correction vector for correcting the phase error of each of the information symbols is defined by the following equation.

$$M=M_i+j \cdot M_q \tag{4}$$

This correction vector M can be computed from the following equations.

$$M_i=(E^{(1)}{}_i+E^{(2)}{}_i)/2 \tag{5}$$

$$M_q=(E^{(1)}{}_q+E^{(2)}{}_q)/2 \tag{6}$$

Hence, the correction vector M can also be calculated essentially by using adders alone. Since multipliers need not be used, the circuit structure can be simplified.

By multiplying the conjugate vector of the correction vector M of the equation (4) by the reception vector D of each of the information symbols, the phase error can be corrected.

In this way, the corrected signal vector shown in the following equation can be obtained.

$$\hat{D}=(D_i+j \cdot D_q) \cdot (M_i-j \cdot M_q)=(D_iM_i+D_qM_q)=(D_iM_i+D_qM_q)+J \cdot (D_qM_i-D_iM_q) \tag{7}$$

Equations (1) through (7) represent operations on a certain path. In actual practice, multiple paths are received. However, the phase error can be corrected for each of the multiple paths by performing the operations of equations (1) through (7) based on each of the post despread signals.

The RAKE synthesis is performed by carrying out such phase correction process on the signal received through each path, and by synchronously adding the received signals of the paths. Then, the synthesized output expressed by the following equations can be obtained.

$$\overline{Di} = \sum_{n=1}^{N} \hat{D}i^{(n)} \tag{8}$$

$$\overline{Dq} = \sum_{n=1}^{N} \hat{D}q^{(n)} \tag{9}$$

Here, the superscript n (n=1, 2, . . . , N) indicates the path number of each of the paths inside a symbol. For example, N is set to 4.

According to the first method, highly accurate correction can be performed since the phases of the information symbol block I is corrected based on the phase error of the pilot symbol blocks P positioned on both sides of the information symbol block I.

FIG. 5 is the phase correction circuit for performing the aforementioned second method. This method corrects phases using the correction coefficient obtained from the pilot symbol block P positioned before the information symbol block I. The phase error extractor 51 extracts phase errors from the received pilot symbol P and averages the phase errors. The phase corrector 52 multiplies the correction vector, which has been calculated based on the output of the phase error extractor 51, by the information symbol.

In this second method, the correction vector is calculated based on the phase error extracted from the received pilot symbol block P preceding the information symbol block I to be processed. The values calculated from equations (10) and (11) are used for the correction vector M.

$$M_i=E^{(1)}{}_i \tag{10}$$

$$M_q=E^{(1)}{}_q \tag{11}$$

The second method does not require the delay means that was used in the first method for storing the received information symbol blocks I. Therefor the circuitry can be downsized since the correction vector is calculated using only the received pilot symbol block P preceding the information symbol block I. However, the correction accuracy achievable with the second method is inferior to the correction accuracy achievable with the first method.

As stated, highly accurate signal reception can be achieved by the first method. However, this method requires a delay means for storing information block I of the reception data. As a result, the first method requires a large amount of circuitry. This poses a serious problem in applying the is method to mobile telecommunication equipment and so forth. According to the second method, the circuitry can be reduced. However, the degree of correction accuracy achievable with the second method is lower than that achievable with the first method.

SUMMARY OF THE INVENTION

Therefore, it is an object of the present invention to provide a signal reception method and an apparatus capable of performing phase correction with a high degree of accuracy using a minimum of circuitry.

The present invention was conceived in order to achieve this object. The signal reception method for the spread spectrum wireless communication system according to the present invention receives a spread spectrum signal consisting of alternating pilot symbol blocks P and information symbol blocks I.

This method has the following steps.

(1) The phase error of each received pilot symbol blocks P is calculated, and a phase correction coefficient is further calculated based on the phase error.
(2) The first symbol of the information symbol block I following the pilot symbol block P is corrected using the calculated phase correction coefficient.
(3) A transmission information symbol is temporarily determined based on the corrected information symbol of the received signal, to determine the phase error of the following information symbol. (4) The phase correction coefficient that has been calculated in step (1) is modified based on the inferred phase error.
(5) The phase error of the subsequent information symbol is corrected based on the modified phase correction coefficient.
(6) Steps (3)–(5) are repeated until the reception and the process of the signal of the information symbol block cI is completed.

The temporary determination in step (3) is performed by using the output of the RAKE synthesizer or, alternatively, output of the delay detection circuit.

Furthermore, the signal reception apparatus for the spread spectrum wireless communication system, according to the present invention, is a signal reception apparatus for the spread spectrum wireless communication system. The spread spectrum wireless communication system recevies signals in which pilot symbol blocks P and information symbol blocks I are arranged alternately when they are transmitted. The wireless communication system processes the received signal in the following way. A quadrature detector quadrately detects a received signal. A matched filter despreads the quadrature detection output from the quadrature detector. The output of the matched filter is input into a delay detection circuit. The output of the matched filter is input into a phase correction means, and the output of the phase correction means is input into a RAKE synthesizer.

The phase correction means operates in the following way. A phase error extractor extracts phase errors from the received pilot symbol blocks P. A phase corrector corrects the phase errors of the information symbols of the information symbol blocks I using one of the corrected phase errors output from the correction vector modifier and the phase error output from the phase error extractor. A temporary determiner temporarily determines information symbols that have been corrected by the phase corrector. A correction vector modifier infers the phase error of the received information symbol being processed using the temporary determination result produced by the temporary determiner and modifies the phase error extracted by the phase error extractor using this inferred phase error.

The temporary determiner temporarily determines a transmission information symbol corresponding to the information symbol by using the output of the RAKE synthesizer or, alternatively, the output of the delay detection circuit.

The phase error can be corrected very accurately by the following steps. (1) The correction vector is calculated from the received pilot symbol block P. (2) The phase error vector of the information symbol is determined from the temporary determination result of the each received information symbols of the information symbol block. (3) The correction vector is modified using the inferred phase error vector. (4) The phase of the received information symbol is corrected by using the modified correction vector.

DETAILED DESCRIPTION OF THE INVENTION

Figure 6:
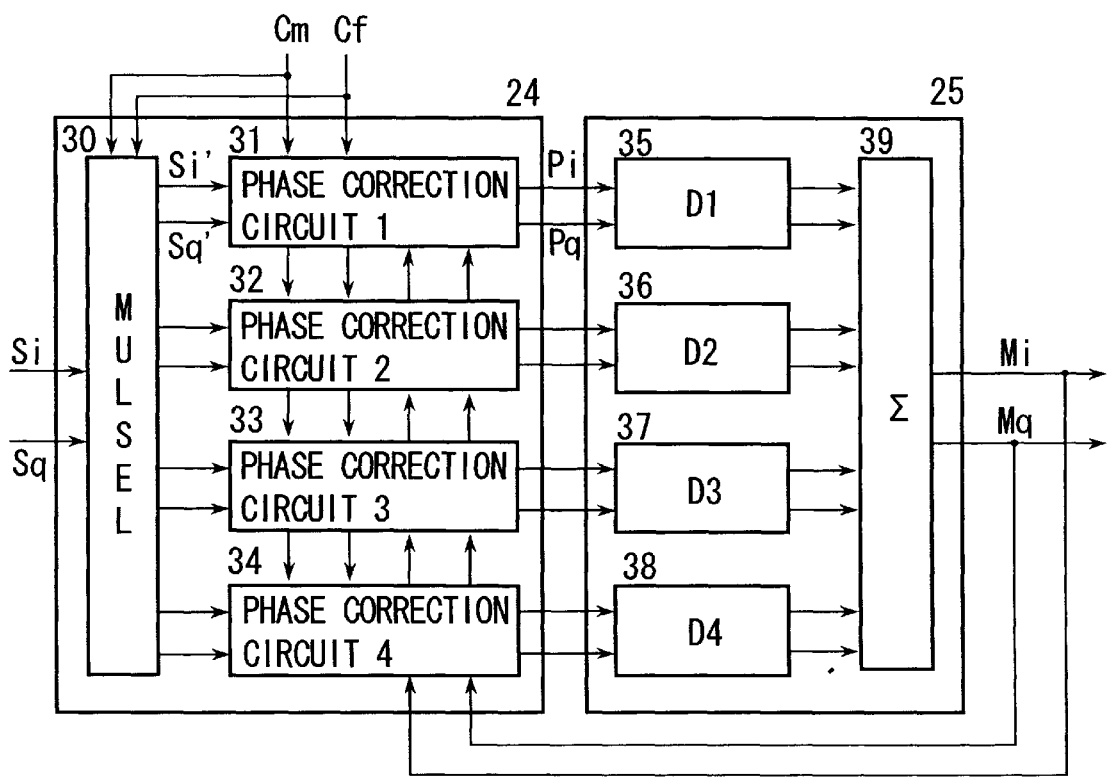
FIG. 6 is a block diagram showing an example of a phase correction means according to an embodiment of the present invention.

FIG. 6 is a block diagram of the phase correction means 24 and RAKE synthesizer 25 according to the present invention. The despread received signals Si and Sq, which are output from a complex-type matched filter 18, are input into the phase correction means 24. The phase correction means 24 has a selector 30 which selectively outputs the despread received signals Si and Sq to multiple phase correction circuits 31–34. These circuits correspond to multiple paths, with timings that correspond to each of the multiple paths.

The timing signal Cf is output from the frame synchronization circuit 21. The signal Cm is output from the multi-path selector 24. The timing signal Cf and the signs Cm are supplied to the selector 30 and the phase correction circuits 31–34. The timing signal Cf initiates the sampling clock generation and the signal Cm defines the sampling timing measured from the timing signal Cf. Each of the phase correction circuits 31–34 corrects the phase of the despread signal of each of the respective paths. The output of each of the phase correction circuits 31–34 is: (1) input into one of the corresponding delay circuits 35–38; (2) delayed by the corresponding delay time so that the timing of all the outputs will coincide; and (3) input to a synthesis circuit 39. The outputs Mi and Mq of the synthesis circuit 39 are fed back to the phase correction circuits 1–4.

Figure 7:
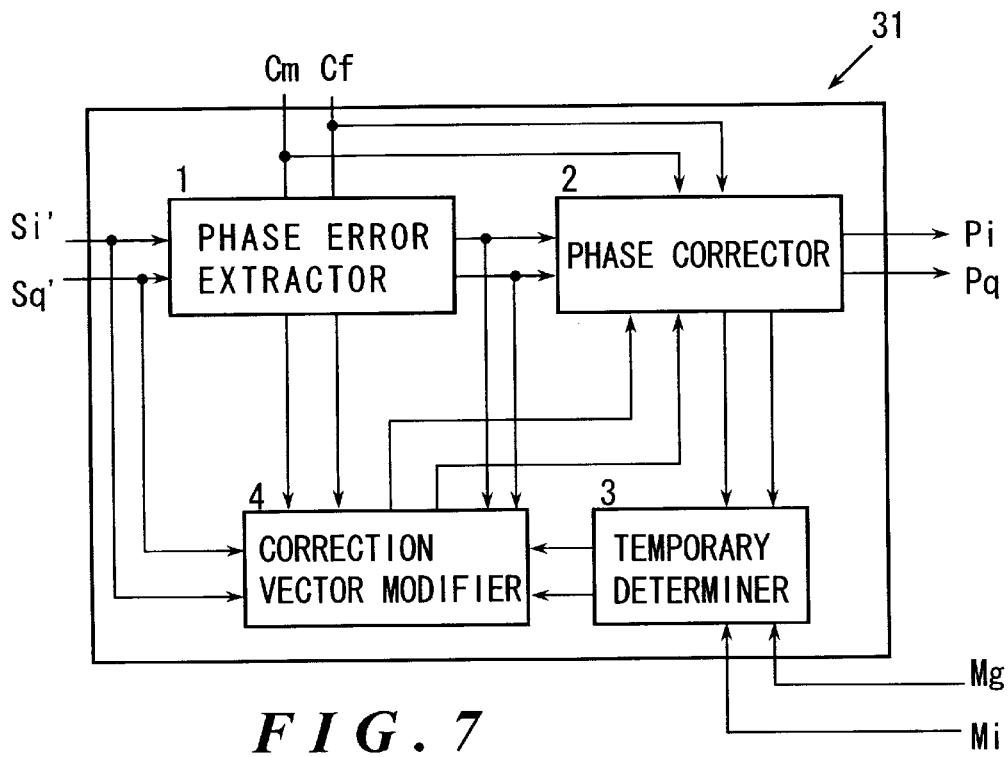
FIG. 7 is a block diagram showing the structure of the phase correction circuit according to an embodiment to which the method of the present invention is applied.

FIG. 7 is an example of the phase correction circuits 31.

Since each of the phase correction circuits 31–34 is identical, the internal structure of only phase correction circuit 31 is shown. A phase error extractor 1 extracts phase errors from the received pilot symbol block P and averages the errors. A phase corrector 2 calculates a correction vector based on the output from a correction vector modifier 4 and a phase error vector output from the phase error extractor 1, and corrects the phase of the received information symbol.

A temporary determiner 3 inputs the output Mq, Mi of a RAKE synthesizer 25 which synthesizes the corrected information symbols of the multiple paths, and temporarily determines a transmission information symbol used for the transmission, from the received information symbol. A correction vector modifier 4: (1) infers the phase error vector of the received information symbol that is being processed; and (2) modifies the correction vector that has been calculated from the pilot symbol using the inferred phase error vector.

Figure 1:
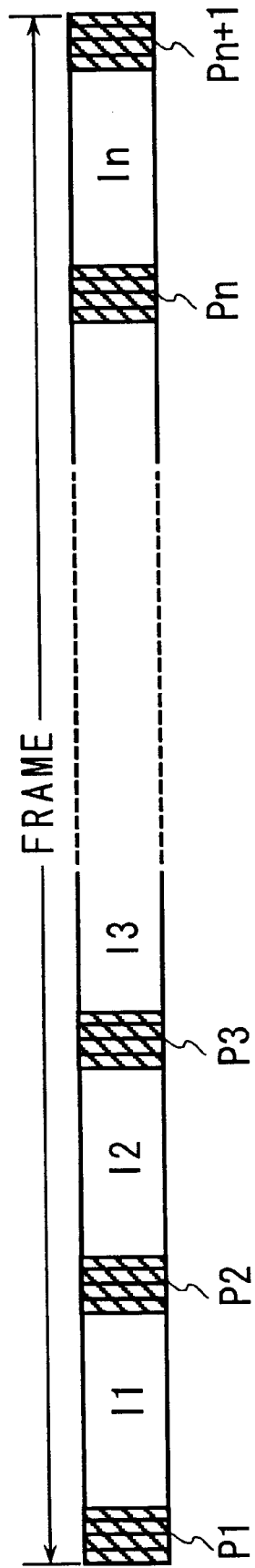
FIG. 1 shows the transmission data structure according to the prior art.
Figure 2:
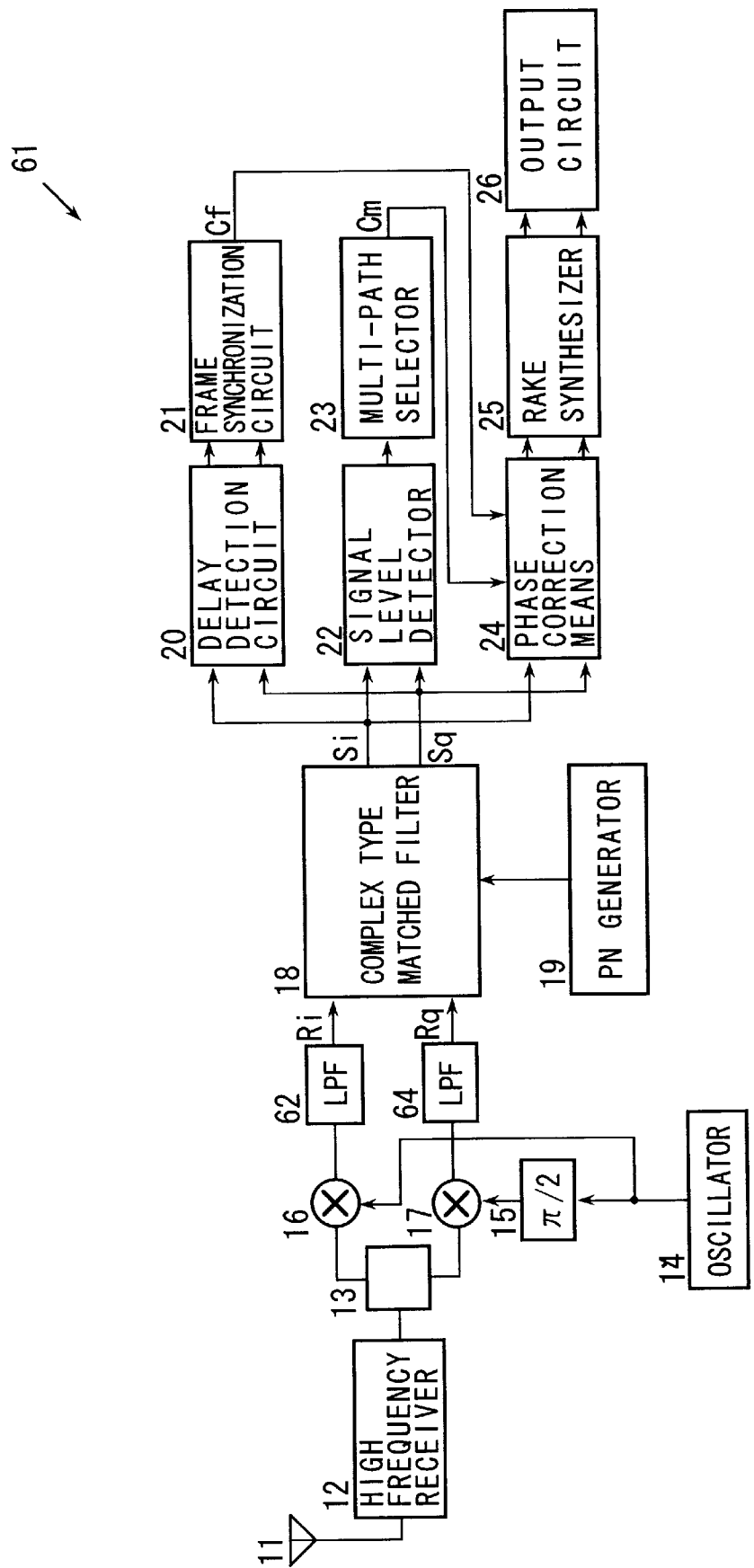
FIG. 2 is a block diagram of the structure of a receiver for performing RAKE synthesis according to the prior art.
Figure 3:
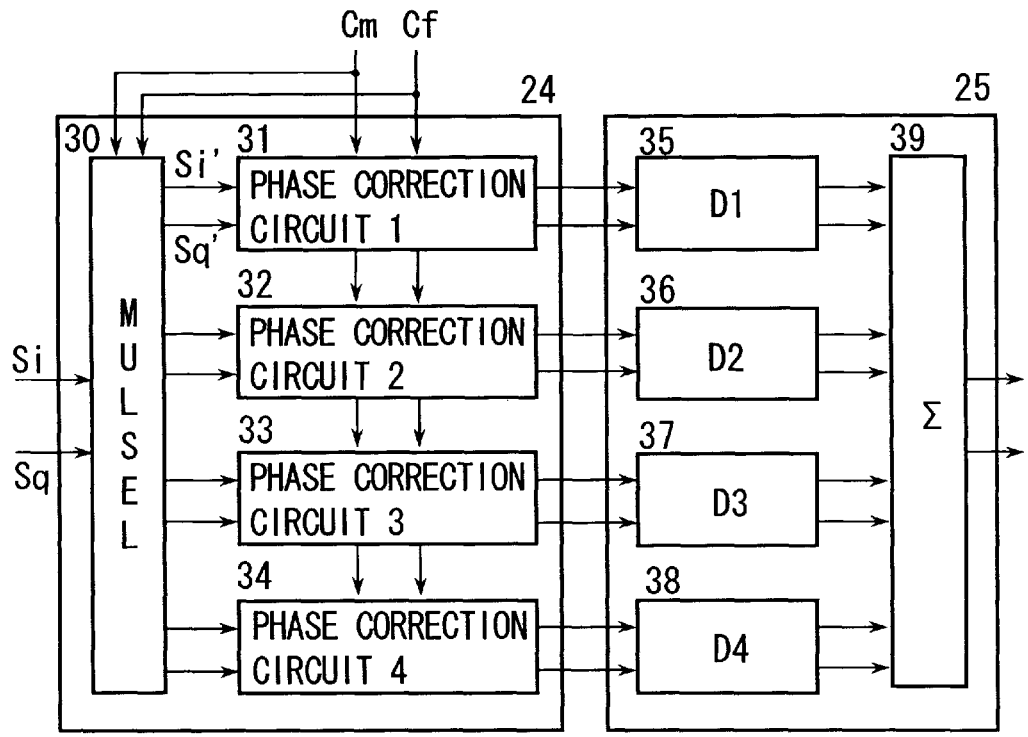
FIG. 3 is a block diagram of a phase correction means according to the prior art.
Figure 4:
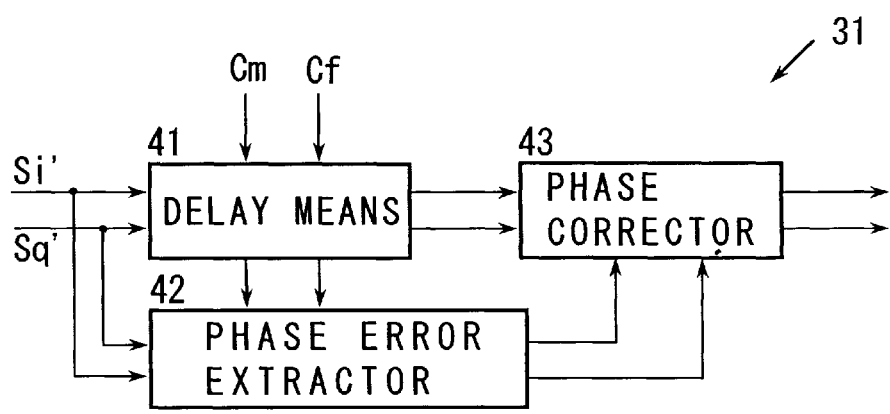
FIG. 4 is a block diagram of a phase correction circuit according to the prior art.
Figure 5:
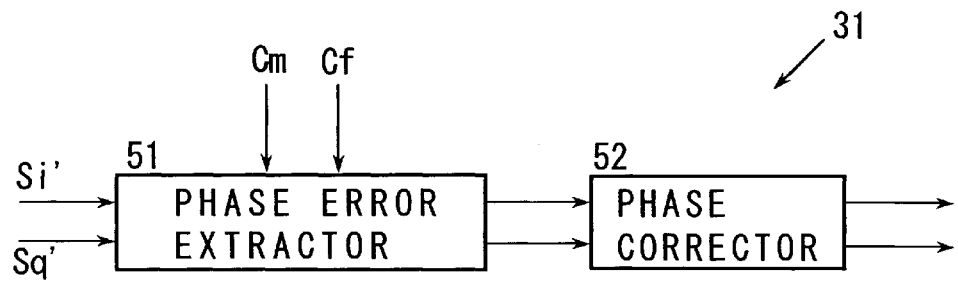
FIG. 5 is a block diagram of a phase correction circuit according to the prior art.
Figure 8:
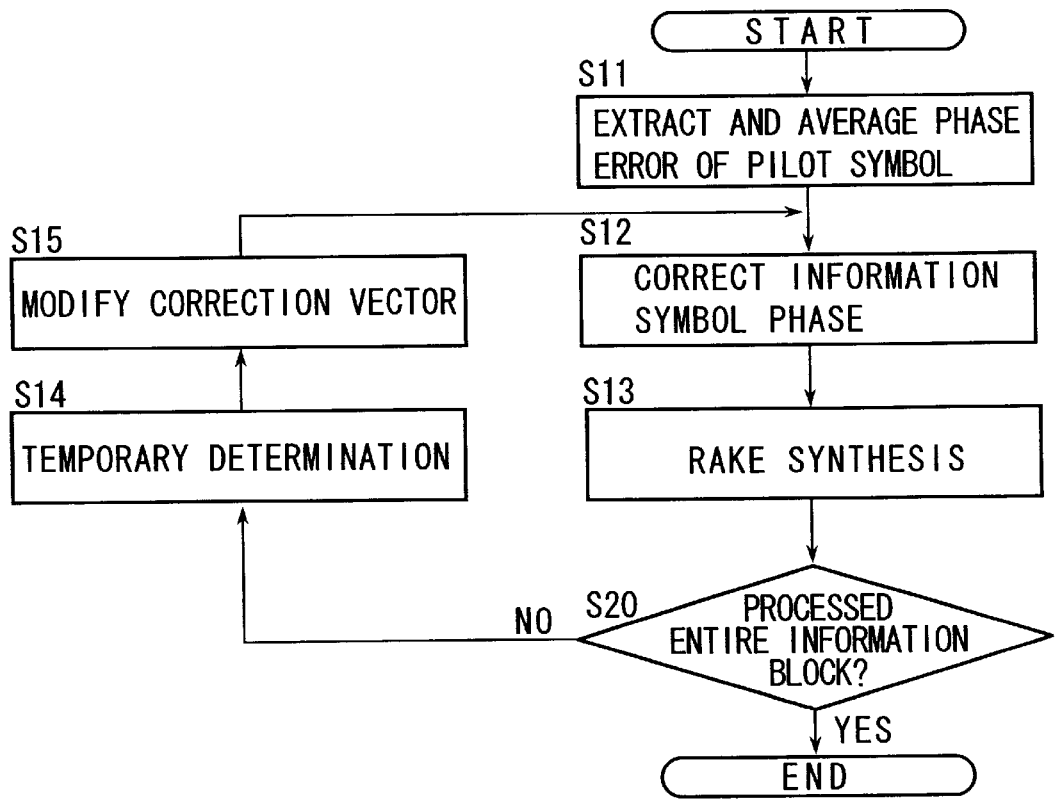
FIG. 8 is a flow chart showing the processes of the embodiment shown in FIG. 7.

FIG. 8 shows the operation of this phase correction circuit. As shown in FIG. 1, a signal transmitted from a transmission station is composed of pilot symbol blocks P and information symbol blocks I that are arranged alternately. Therefore, when the signal of a pilot symbol block P is received first, the phase error of the pilot symbol is extracted by the phase error extractor 1, the phase errors of L pilot symbols of the pilot symbol block P that is being processed are averaged, and the average phase error vector $E^{(1)}$ is calculated (step S11). This operation is performed using the aforementioned equations (1) and (2).

When the reception of the signal of the subsequent information symbol block I starts, a phase correction process is performed on the signal of this information symbol I by the phase corrector 2. In other words, first, the phase of the signal of the first information symbol of the information symbol block I is corrected (step S12) using the correction vector $M^0$ that has been calculated from the phase error vector $E^{(l)}$ calculated in step S11.

The correction vector $M^0$ is calculated in accordance with the aforementioned equations (10) and (11). Then, the phase error is corrected by multiplying the conjugate vector of the correction vector $M^0$ with the reception vector of the first information symbol. This phase correction process is performed on the signal received through each path; it is performed in the phase correction circuits 31–34 respectively for each of the paths.

The first information symbol block I is corrected by the phase corrector 2 of each of the phase correction circuits 31–34 for each of the paths in this way, is input to the RAKE synthesizer 25, and is RAKE-synthesized as explained before (step S13). The outputs Mi and Mq of the RAKE synthesizer 25 are supplied to a determination circuit not shown in the diagram, which determines whether the entire information symbol block I has been processed.

If the entire information symbol block I has been processed, the phase correction process is completed. Otherwise, the process is returned to step S14 (step S20), and the outputs Mi and Mq of the RAKE synthesizer 25 are supplied to the temporary determiner 3, which temporarily determines the corresponding transmission vector on the transmission side (step S14). The result of this temporary determination is input to the correction vector modifier 4.

Now, as a result of the temporary determination step S14, the transmission information vector corresponding to the processed information symbol has been temporarily determined to be (c+j·d), and the post despread received information symbol has turned out to be (Di+j·Dq) When these values are obtained, the phase error vector $E^1$ of the received information symbol can be obtained by the following equation.

$$E^k = (D^k_i + j \cdot D^k_q) \cdot (c^k - j \cdot d^k) \quad (12)$$

Here, the superscript k indicates the number of the information symbol in the information symbol block I. When the first information symbol is received, k=1.

Based on the phase error vector $E^1$ of the first information symbol that has been calculated in accordance with equation (12), the correction vector $M^0$ calculated step S11 is modified according to equation (13). The modified result is defined to be a new correction vector $M^1$.

$$M^k = \alpha M^{k-1} + (1-\alpha) E^k \quad (13)$$

Here, α is a coefficient less than 1, which determines the weight of the phase correction amount based on the temporary determination result. The value of this coefficient α can be arbitrarily in accordance with the propagation conditions and so forth. For example, the value of this coefficient α can be set to 0.5 when the identical weights all given to the phase error that is generated in the information symbol and the phase error that is generated in the pilot symbol. A large value can be assigned to α when a dominant weight is given to the phase error due to the pilot symbol.

By using the new correction vector $M^1$ that has been calculated in accordance with equation (13), the phase error due to the next information symbol (the second symbol in the information block I being processed) is corrected (step S12).

Similarly, when the second information symbol of the information symbol block I is received, a transmission information vector corresponding to this second information symbol is temporarily determined by the temporary determiner 3 (steps S13 and S14). Then, the correction vector modifier 4 substitutes the phase error vector $E^2$ of this reception data into equation (13) to obtain a new correction vector $M^2$. In this case, one has $E^{(1)} = M^1$. Using this modified correction vector $M^2$, the phase error of the received information symbol to be received next is corrected (step S12).

Similarly, in the following, the correction vector $M^k$ is modified sequentially based on the temporary determination result for the sequentially received information symbol. By using this modified correction vector $M^k$, the phase error of the subsequent information symbol is corrected.

In equation (13), the phase error vector $E^{(1)}$ that has been detected exclusively from the received pilot symbol block P is modified using the phase error vector resulting from the temporary determination of each of the information symbols. However, as an alternative, the modified correction vector $M^K$ can be further modified by using the subsequent pilot symbol or the phase error vector to be inferred from the temporary determination result for the information symbol and can be used for correcting the subsequent phase error vector.

According to the present invention, the circuitry of the apparatus can be downsized since no large-scale delay circuit means for delaying information symbol blocks I is needed. In addition, the correction accuracy can be improved since the correction vectors are modified in accordance with the received information symbols.

Figure 9:
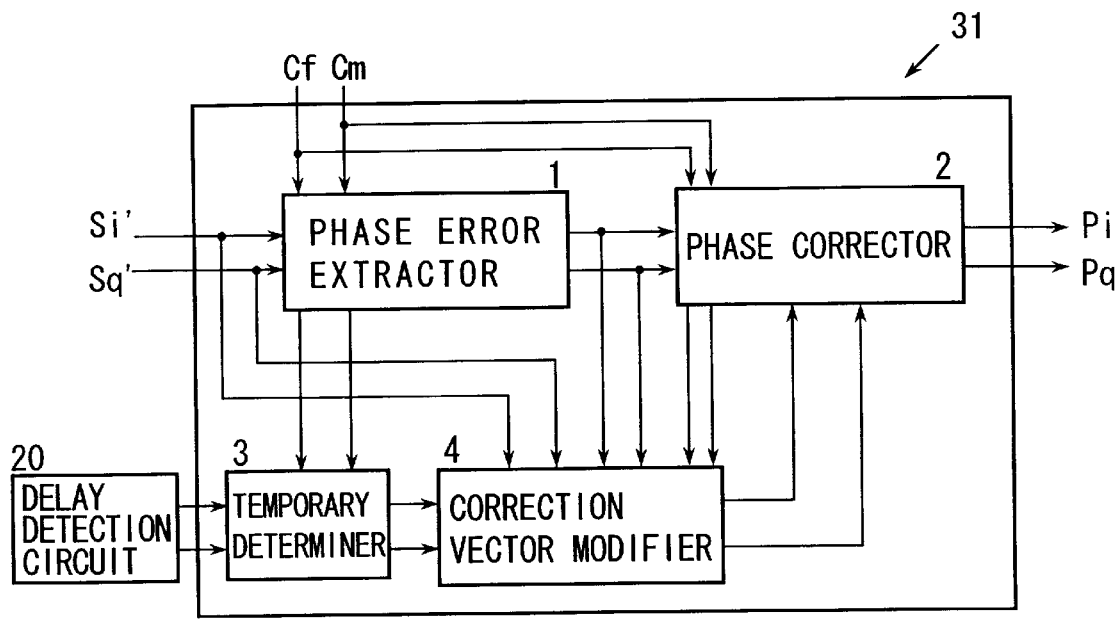
FIG. 9 is a block diagram showing the structure of the phase correction circuit according to another embodiment to which the method of the present invention is applied.

FIG. 9 is a block diagram showing the structure of the phase correction circuits 31 according to the second embodiment. In the first embodiment shown in FIG. 7, the temporary determination of the transmission information vector to be processed was performed using the output of the RAKE synthesizer 25. In this second embodiment, the output of the delay detection circuit 20, which is used for the frame synchronization by the frame synchronization circuit 21, is also used as the temporary determination result.

In FIG. 9, the same reference numerals are used for the elements identical to those of FIG. 7, and hence explanation of such elements will not be repeated. As shown in the diagram, the output of the delay detection circuit 20 is input to the temporary determiner 3. As stated above, since the transmission vector of the pilot symbol is known, it is possible to determine the transmission vector of the information symbol of the information symbol block I from the output of the delay detection circuit 20. Therefore, the detection output of the delay detection circuit 20 used for frame synchronization can be also used as the temporary determination result.

Figure 10:
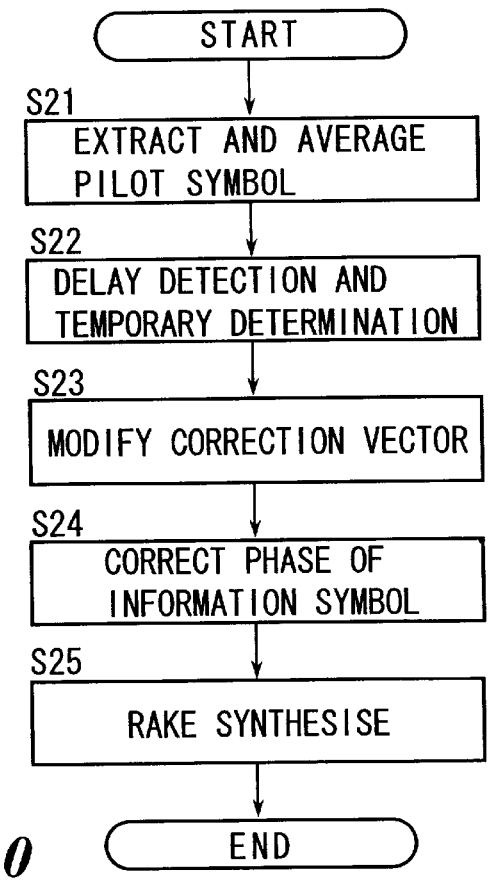
FIG. 10 is a flow chart of processes of the embodiment shown in FIG. 9.

FIG. 10 is a flow chart of the processes of this second embodiment. When the signal of the pilot symbol block P is received, the phase error extractor 1 extracts the phase errors of each of the received pilot symbols, averages the phase errors, and calculates the phase error vector $E^{(1)}$ (step S21).

Meanwhile the delay detection circuit 20 detects the delay of the received signal. Following the pilot symbol block P, the delay detection output of the received information symbol of the information symbol block I is output. The temporary determiner 3 temporarily determines the corresponding transmission information vector using the delay detection output that corresponds to the information symbol that is output from the delay detection circuit 20 (step S22).

By using this temporary determination result, the phase error vector of the received information symbol being processed is calculated using the equation (12). Then, using this calculated phase error vector, the phase error vector $E^{(1)}$ that has been calculated in the step S21 is modified by the equation (13), and a correction vector to be used for correcting the phase error of the subsequent information symbol is calculated (step S23).

In step S24, the phase of the received information symbol is corrected based on the correction vector that has been calculated in step S23. Since a temporary determination result is not output in step S22 for the first information symbol of the information symbol block I following the pilot symbol block P, the correction vector that calculated based on the phase error vector $E^{(1)}$ in step S21 is used for correcting the phase.

The phase error of the second information symbol of the information symbol block I is corrected by the correction vector that has been modified based on the delay of the first information symbol detected by the delay detection circuit 20 in steps S22 and S23. When the third information symbol of the information block is received, the phase error is corrected by the correction vector that has been re-modified in the correction vector modifier 4. The correction vector modifier 4 re-modifies the correction vector based on the delay detection output of the second information block emitted from the delay detection circuit 20. Subsequently, the phase of subsequent information symbols in this information symbol block I are similarly corrected.

The despread signals of the information symbols whose phase errors have been corrected that are sequentially output from the phase corrector 2 in this way are input to the RAKE synthesizer 25. Then, the despread signals are synthesized with the outputs corresponding to other paths and are output from the phase correction means 33 (step S25) as mentioned before, and the entire phase correction process is completed.

In the above explanation, the correction vector is calculated based solely on the received pilot symbol block P positioned before the information symbol block I to be processed, and the correction vector to be processed is modified based on the temporary determination result of the information symbol. Alternatively, as the first method of the conventional art, the correction vector can be calculated based on the symbols of the pilot block P positioned before and after the information symbol block I to be processed. The corresponding correction vector can be modified based on the temporary determination result for the information symbol. In this case, the present invention requires a circuit means for delaying one information symbol block. However, in comparison with the conventional art, the present invention can perform phase correction with a higher degree of accuracy.

As explained in the above, according to the present invention, the phase error can be corrected with a high degree of accuracy since the correction vectors are calculated based on the phase error signal that has been extracted from the received pilot symbol block P. The phase errors are sequentially modified by using the phase errors of the information symbols that have been inferred by temporarily determining the information symbols.

The phase error signal is extracted from the pilot symbol block P that is positioned only before the information symbol block I to be processed. Therefore, the correction accuracy is improved without a large circuitry since no means for delaying the received information symbol block is needed. Furthermore, since the temporary determination is made using the RAKE synthesizer or the output of the delay detection circuit, the amount of circuitry required for the temporary determination can be kept minimal.

What is claimed is:

1. A phase correction method for correcting a phase of a received spread spectrum signal in a spread spectrum wireless communication system, wherein the spread spectrum signal has a pilot symbol block and an information symbol block arranged alternately, the information symbol block containing a plurality of information symbols, the phase correction method comprising:
   (1) calculating a phase error of the pilot symbol block and further calculating a coefficient for correcting the phase based on the calculated phase error;
   (2) correcting a phase of a first information symbol of the information symbol block that follows the pilot symbol block using the calculated coefficient;
   (3) temporarily determining a value of the information symbol, the phase of which has been corrected;
   (4) inferring a phase of a subsequent information symbol based on the determined value;
   (5) modifying the coefficient for correcting the phase using the inferred phase;
   (6) correcting the phase of the subsequent information symbol based on the modified coefficient; and
   (7) repeating (3)–(6) until all information symbols of the information symbol block are processed.

2. A receiving method claimed in claim 1, wherein:
   the received spread spectrum signal has multi-path signals; and
   the value of the information symbol is temporarily determined using a synthesized signal, which is synthesized from the multi-path signals by a RAKE synthesizer.

3. A receiving method claimed in claim 1, wherein:
   the received spread spectrum signal has a frame containing the pilot symbol block and the information symbol block; and
   in step (3), the value of the information symbol is temporarily determined using a delayed timing of the flame detected by a delay detection circuit.

4. A phase correction apparatus for correcting a phase of a received spread spectrum signal which has a pilot symbol block and an information symbol block arranged alternately, the information block containing a plurality of information symbols, the phase correction apparatus comprising:
   a phase error extractor for extracting a phase error from the pilot symbol block;
   a phase corrector for correcting a phase of the information symbol based on the phase error, which has been previously obtained;
   a temporary determiner for temporarily determining the value of the information symbol, the phase of which has been corrected by the phase corrector; and a correction vector modifier which infers a phase error of the information symbol using the value of the information symbol and modifies the phase error extracted by the phase error extractor using the phase error of the information symbol.

5. A phase correction apparatus claimed in claim 4, wherein:

the received spread spectrum signal has multi-path signals; and the temporary determiner determines the value of the information symbol using a synthesized signal, which is synthesized from the multi-path signals by a RAKE synthesizer.

6. A phase correction apparatus claimed in claim 4 wherein:

the received spread spectrum signal has a frame containing the pilot symbol block and the information symbol block; and the temporary determiner determines the value of the information symbol using a delay of the frame detected by a delay detection circuit.

7. A mobile station for spread spectrum communication system comprising:

an antenna which receives a spread spectrum signal transmitted through multiple paths;

a quadrature detector which quadrature-detects the spread spectrum signal received by the antenna and produces a quadrature detected signal;

a matched filter which despreads the quadrature detected signal and outputs multi-path signals having frames and being transmitted through the multiple paths, each of the frames containing a pilot symbol block and an information symbol block;

a phase error extractor which extracts phase errors of the multi-path signals based on the pilot symbol block;

a phase corrector, which corrects each phase of the multi-path signals using the phase errors;

a correction vector modifier which corrects the phase errors of the multi-,path signals extracted by the phase error extractor using the information symbol block; and a RAKE synthesizer which synthesizes the multi-path signals, the phases of which have been corrected by the phase corrector.

8. A mobile station claimed in claim 7, further comprising a temporary determiner for temporarily determining the value of the information symbol, the phase of which has been corrected by the phase corrector, wherein the correction vector modifier infers a phase error of the information symbol using the value of the information symbol and modifies the phase error extracted by the phase error extractor using the phase error of the information symbol.

9. A mobile station claimed in claim 8, wherein the temporary determiner determines the value of the information symbol using a synthesized signal, which is synthesized from the multi-path signals by the RAKE synthesizer.

10. A mobile station claimed in claim 8, wherein the temporary determiner determines the value of the information symbol using the synchronization timing.

* * * * *